_United States Patent Office_ 3,464,566
Patented Sept. 2, 1969

3,464,566
RACKS FOR DRYING ARTICLES
Robert John Gilson, Naphill, England, assignor to Charles Colston Limited, High Wycombe, Buckinghamshire, England, a corporation of the United Kingdom
Filed Dec. 26, 1967, Ser. No. 693,462
Claims priority, application Great Britain, Jan. 6, 1967, 1,010/67
Int. Cl. A47g 29/00, 19/08
U.S. Cl. 211—71                                              4 Claims

ABSTRACT OF THE DISCLOSURE

The invention resides in a rack intended primarily for use in dishwashing machines in which in order to eliminate drip marks on articles dried in the racks, the drip is transferred from the article to a part of the rack.

---

This invention relates to racks for holding glasses and other articles when drying.

More particularly it is concerned with an article holding rack for use in a dishwasher with reference to which it is hereinafter described in detail. The problem of complete dryness of the load is one with which manufacturers of dishwashers have had to contend over a number of years and to which as yet no completely satisfactory solution has been found.

It is easy to obtain dry surfaces generally, but difficult to eliminate the final drip which hangs from the lowest point of a dish or article. This difficulty is particularly marked in the case of drinking glasses, since glasses are usually light in thickness at the rim where the drips form, and therefore there is little residual heat available to aid evaporation of the drip. Furthermore, even when the drip is evaporated completely this results in a mark caused by the deposition of any dissolved solids in the rinse water, which mark is of course much more noticable on glassware than on opaque ware such as china cups and plates. These difficulties are, as indicated above, widely known in dishwasher circles, and are the cause of the long drying periods (15–20 minutes) used in some machines. Some manufacturers have attempted to deal with the problem by providing a steam "rinse" so that the final drip is composed largely of condensed water which is free from dissolved solids and therefore not liable to cause marks when evaporated, but this is an added complication which has a number of disadvantages.

This invention seeks to provide means of preventing the drip forming on the article, rather than be forced to go to considerable trouble to remove it slowly by evaporation, and we have found that this can be achieved very simply by the addition of a "dedripping" element to the rack.

According to the present invention when drying articles in a rack, the articles are so placed that their lowest points make contact with a support element or part of the rack so shaped that any drip which tends to form at the lowest part of the article is transferred to the said element or part of the rack.

As applied to a rack for use in a dishwasher the rack may be provided at selected points with dedripping elements so that articles, e.g., a glass supported by the rack in particular locations, will make contact at their lowest points with a dedripping element. It follows that the drip which would otherwise tend to collect at the lowest point of the glass is conducted away by the dedripping element and collects instead at the lowest point thereof.

Figure 1:
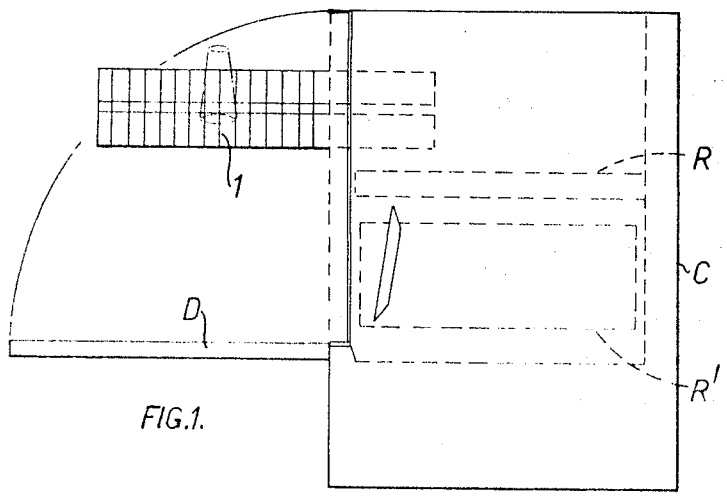
Figure 2:
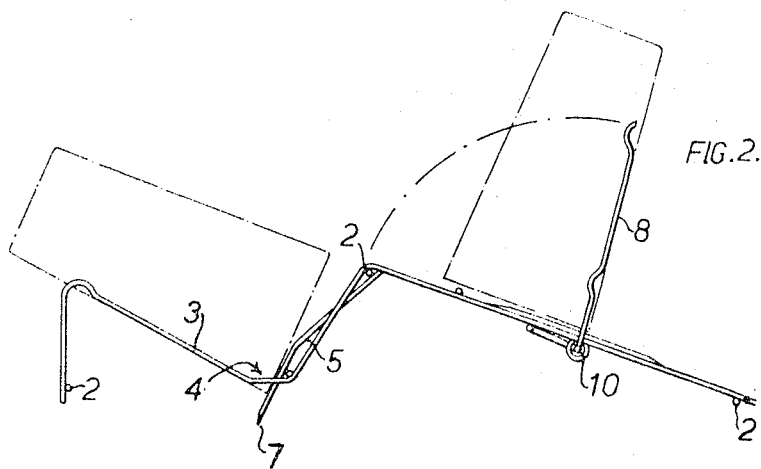
Figure 3:
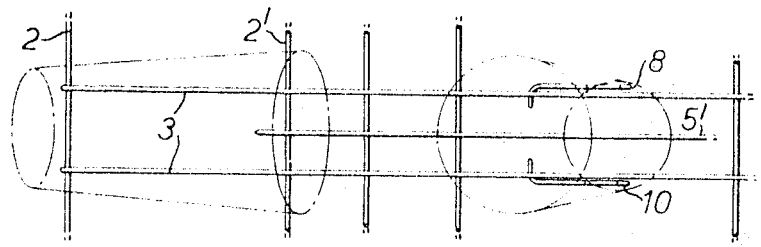

One embodiment of the invention is illustrated in the accompanying drawings in which:

FIGURE 1 is a view of a dishwasher having two article supporting racks one of which is fitted with dedripping means, and FIGURES 2 and 3 are a front and plan view of part of a glass rack having dedrip wires.

In the drawings C indicates generally the cabinet of a dishwasher having a front opening door D and upper and lower racks indicated at R, $R_1$, the lower rack $R_1$ being intended mainly for plates.

Referring to FIGURE 1, the upper rack R on which glasses and cups are usually stacked is provided with dedripping elements at various points which are so positioned in relation to the locations for the glasses that when a glass in inserted in the rack its lower edge will make contact with the element. Thus in the arrangement of FIGURE 1 the rib indicated at 1 will function as dedripping element being in contact with the lowermost point of the glass with the result that any drip which otherwise tends to collect on the glass is conducted away by the rib 1 and collects instead at the lowest point of the latter.

Referring now to FIGURES 2 and 3, there is shown a rack made up of longitudinals 2, 2' . . . and transverse members 3, the members 3 having a bend 4 providing a recess in which the glass is located. In order to remove the drop which would otherwise tend to collect at the lowest point of the mouth of the glass, an additional rib in the form of a wire or strip is provided at 5 which touches and extends below the glass or article, the wire being provided with a pointed end 7 to minimise the size of drip that can collect thereon. On the other side or central portion of the rack, which is intended also for larger dishes or articles, there may be provided a bracket 8 which is hingedly supported at 10 so that in its operative position, i.e. when used to support a glass, it is swung to its full line position as shown and when not in use folds down flat against the transverse members 3 of the rack. At this position the dedrip wire 5 is extended as at 5' so that the lowest part of the glass when supported by the bracket arm 8 will rest on or against it with the result that as described above the drip will run down from the glass onto the wire 5.

Since (as explained in the foregoing) the drip problem is confined mainly to glasses, it is sufficient in practice to add the dedripping elements to those positions of the rack which are adapted to receive glasses.

Simple as this solution now appears to be, it has not previously been used in dishwashers, and has in fact only been arrived at after the expenditure of much effort in numerous past attempts to overcome the problem in less simple ways.

I claim:

1. In a rack for drying glassware and like articles comprising an open frame having locations for the articles, the improvement in which selected locations are provided with a support element so arranged in relation to the article when positioned in the rack that a drip which tends to form at the lowest part of the article is transferred to the support element in order to prevent formation of drip marks on the article.

2. A rack device as claimed in claim 1 comprising an open wire frame in which the support element comprises a strip additional to the primary frame wires and positioned to make contact with an article when placed therein.

3. A rack device as claimed in claim 2 in which the strip comprises a wire terminating in a downwardly extending pointed end.

4. A method of drying glassware-like articles following washing in a dishwasher wherein the articles during washing are supported in a rack which comprises contacting the article at its lowest point with a part of the rack, which slopes downwardly away from the article so that a drip which otherwise would form on the article is transferred to said part.

References Cited

UNITED STATES PATENTS

| | | | |
|---|---|---|---|
| 2,981,267 | 4/1961 | Stoddard | 211—41 X |
| 3,258,127 | 6/1966 | Cushing | 211—41 |
| 3,289,854 | 12/1966 | Kauffman | 211—41 |

DAVID H. BROWN, Primary Examiner

U.S. Cl. X.R.

211—41